Nov. 24, 1953      G. L. KALB      2,660,150
POULTRY FEEDER
Filed Dec. 12, 1952      2 Sheets-Sheet 1
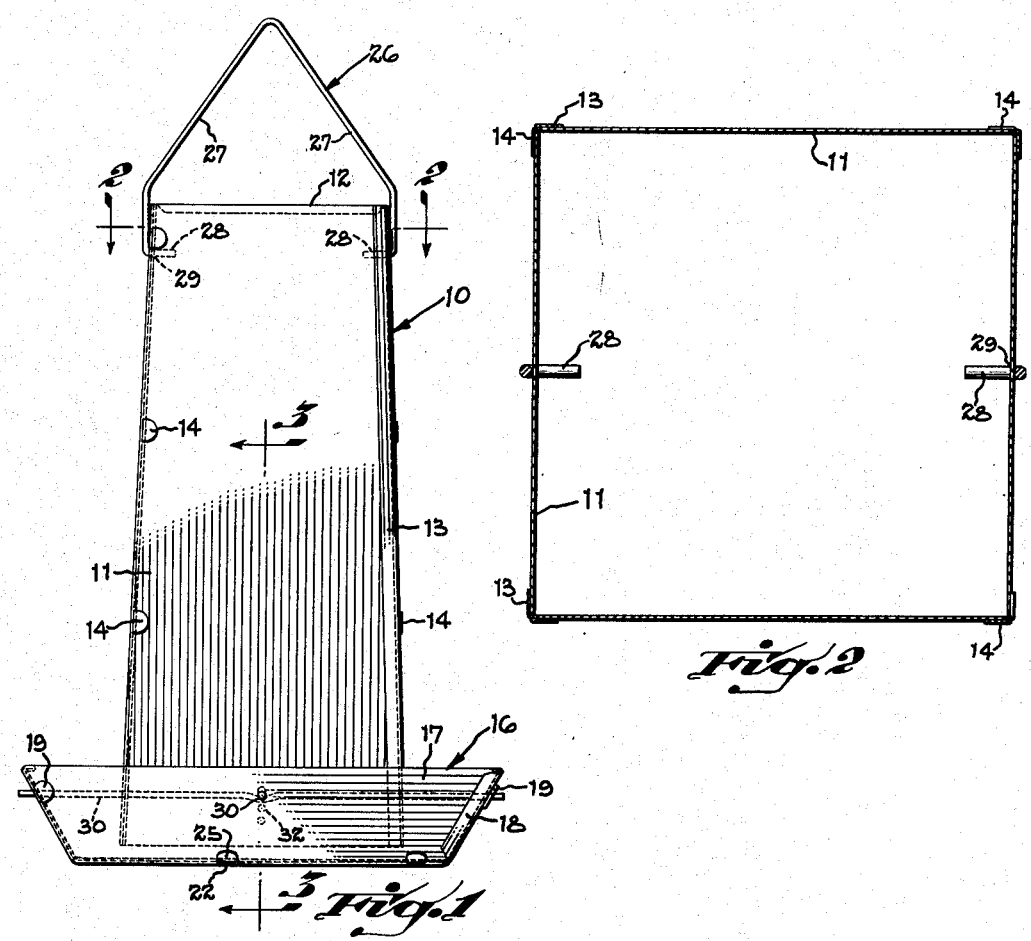
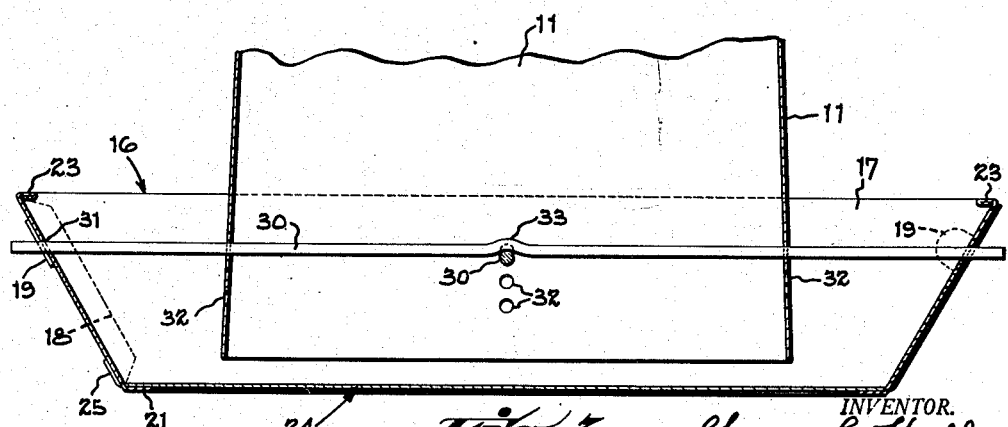
INVENTOR.
George L. Kalb.
BY Wood, Herron & Evans,
ATTORNEYS.

Nov. 24, 1953 — G. L. KALB — 2,660,150
POULTRY FEEDER
Filed Dec. 12, 1952 — 2 Sheets-Sheet 2

INVENTOR.
George L. Kalb.
BY Wood, Herron & Evans.
ATTORNEYS.

Patented Nov. 24, 1953

2,660,150

UNITED STATES PATENT OFFICE 2,660,150

POULTRY FEEDER

George L. Kalb, Middletown, Ohio, assignor to Aeronca Manufacturing Corporation, Middletown, Ohio, a corporation of Ohio Application December 12, 1952, Serial No. 325,589

1 Claim. (Cl. 119—53)

This invention relates to poultry feeders of the type consisting of a hopper or casing having a feed pan associated with the lower end thereof.

In the past such feeders have been cylindrical in construction and have presented serious storage and shipping problems because of their size. It is the object of the present invention to provide an improved poultry feeder of knock-down construction which incorporates novel means for joining the various parts in assembly, whereby the unit may be stored and shipped in flat condition, and subsequently set up for use quickly and easily without the use of tools.

In the preferred embodiment, the hopper is rectangular, consisting of four identical flat panels which are joined at their respective side edges by a novel interlocking flange and tab construction. The same general construction is also utilized for the feed pan, it consisting of four identical panels constituting side walls and a square sheet constituting a bottom. An outstanding feature of the present feeder construction resides in the means which are provided for joining the hopper and pan. In the preferred embodiment, the means consist of a pair of metal rods which are mounted in the pan in crossed relationship. The respective rods transverse apertures in the side walls of the pan and in the lower ends of the panels making up the hopper. The respective rods are configurated to interlock with one another where they cross so that additional fastener means, such as cotter pins, are not required.

Other objects and features of the invention will be apparent to those skilled in the art from the following description of the drawings in which:

Figure 1 is a side elevational view of a poultry feeder incorporating the principles of the present invention.

Figure 2 is an enlarged fragmentary cross sectional view taken on the line 2—2 in Figure 1.

Figure 3 is an enlarged fragmentary cross sectional view taken on the line 3—3 of Figure 1.

Figure 8:
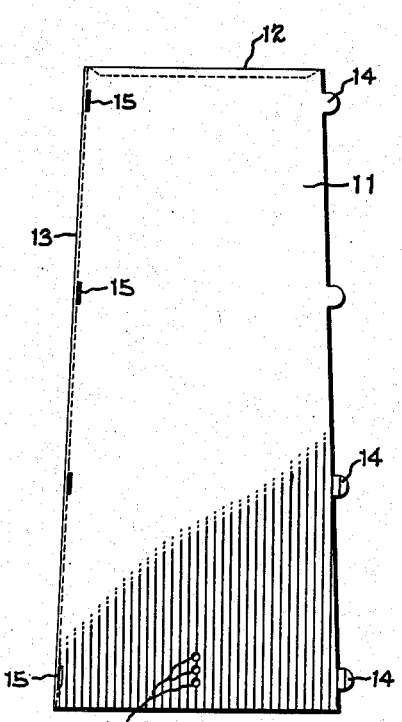
Figure 8 is a side elevational view of one of the hopper panels.

The hopper or casing of the poultry feeder is indicated generally at 10. The hopper comprises four identical side panels each of which is indicated by the numeral 11. One of these panels is shown in Figure 8. The panel is formed from galvanized sheet metal, approximately 28 gauge, by ordinary stamping and dieing operations. The panel tapers from the bottom edge to the top edge, with the top edge being doubled over to provide a bead 12. As seen in Figure 8, the left side edge of the panel 11 is turned over at a right angle to provide a flange 13. The opposite edge, the right one as seen in Figure 8, has a plurality of small rounded tabs 14 extending outwardly therefrom. Opposite each of the tabs 14, and adjacent the inner edge of flange 13, slots 15, complementing tabs 14, are stamped in the panels. In the instance shown, four tabs and four slots are provided.

Figure 9:
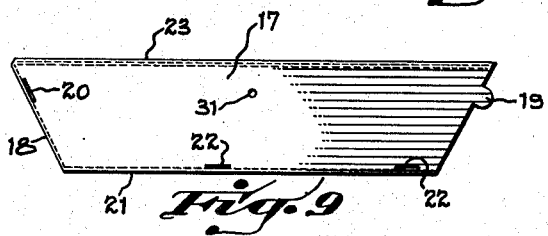
Figure 9 is a side elevational view of one of the feed pan side panels.
Figure 10:
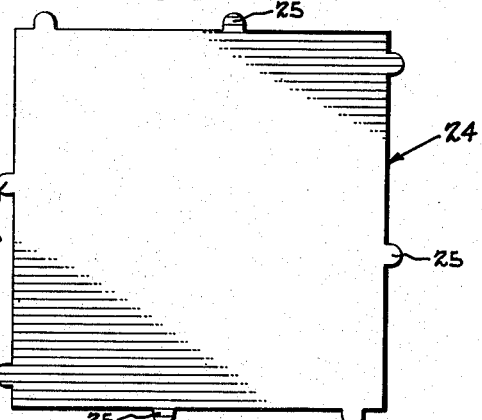
Figure 10 is a top plan view of the bottom panel of the feed pan.

The same general construction is utilized for the pan portion of the feeder, the pan being indicated generally at 16. The material for the pan may be the same as that used for the hopper panels. As seen in Figure 9, each side panel 17 of the pan is in the shape of an isosceles trapezoid in which the upper edge is substantially longer than the lower edge, so that when the four panels are assembled the sides of the pan flare outwardly. The left-hand edge of the panels 17, as seen in Figure 9, is flanged as at 18, the same as the left-hand edge of hopper panel 11. The opposite edge has a tab 19, similar to a tab 14, and a slot 20 is provided adjacent flange 18 which is similar to the slots 15. The bottom edge of panel 17 is also flanged as at 21, and in the instance shown, has two slots 22 which are stamped through the panel just inwardly of flange 21. The upper edge of panel 17 is turned inwardly and then doubled back upon itself to provide a beaded edge 23. The bottom for the pan is indicated generally at 24 and comprises a square sheet of galvanized metal having tabs 25 extending from its respective edges which are designed to engage slot 22 in the lower edge of side panel 17.

Assembly of the hopper and of the pan is substantially the same. In the hopper the four panels are secured together by inserting the tabs 14, at the left edge of one panel, in the slots 15 at the right edge of an adjoining panel. The tabs are then bent over as shown in Figures 1–4. The same technique is employed in assembling the side panels of the pan; however, the bottom panel 24 must be taken into consideration and fastened to the side panels by engaging 25 in slots 22 before securing tabs 19 in slots 20. The assembly provided in each instance is strengthened by the overlapping relationship of the edge flanges. (See Figure 2.)

As is the usual practice, a bail 26 is provided for hanging the feeder from a support to keep the pan off the ground. The bail as shown in Figure 1 is generally triangular in shape having side arms 27—27, which meet at a point centered with respect to the vertical axis of the hopper, and pivots 28—28 which are engaged in apertures 29 formed in opposite panels adjacent their respective upper edges.

The two elements of the assembly, the hopper and the pan, are secured together by a pair of cross rods 30. Each rod is formed from a length of heavy galvanized wire, for example 3/16 diameter. An aperture 31 is formed in each of the side panels 17 of the pan on the vertical center line between its respective ends and approximately midway between the horizontal center line and the upper edge of the panel. In assembly, the apertures in the panels are opposite one another in position to receive the respective ends of the rods 30. Each of the side panels 11 of the hopper has three apertures in it which are aligned vertically with respect to one another adjacent the lower edge thereof. These apertures are indicated at 32. (See Figure 3.) Each rod 30, in assembling the two elements, is threaded through an aperture in a side panel 17 of the pan, through one of the three apertures 32 in one of the side panels 11 of the hopper, then through the corresponding aperture 32 in an opposite side panel of the hopper, and then through the aperture 31 in the opposite side panel 17 of the pan. This is done with both rods.

Figure 4:
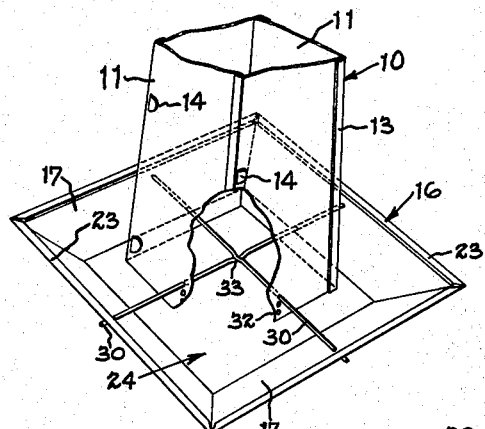
Figure 4 is a reduced fragmentary perspective view illustrating the means for fastening the hopper to the pan. In this view the fastening means are shown in relaxed condition, for example when the hopper is empty.
Figure 6:
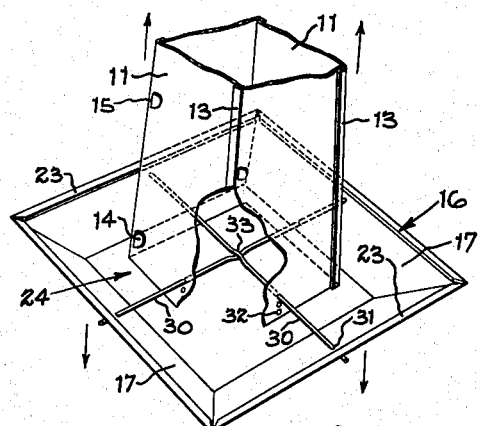
Figure 6 is a view similar to Figure 4 showing the fastening means under conditions in which the hopper is loaded.
Figure 5:
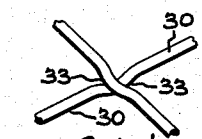
Figure 5 is an enlarged fragmentary perspective view showing the interlocking action of the fastening means illustrated in Figure 4.
Figure 7:
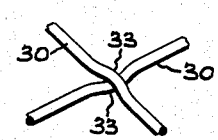
Figure 7 is a view similar to Figure 5 showing the fastening means interlocked under the conditions illustrated in Figure 6.

The three vertically aligned holes 32 provide means for adjusting the hopper vertically with respect to the bottom of the pan for changing the rate of flow of feed from the hopper into the pan.

Where the two rods cross at their respective mid-points, each is offset, as at 33, on a radius corresponding to approximately ½ its diameter. The offset in one rod is designed to interlock with the offset of the other. Referring now to Figures 4–7, the interlocking of the two offset portions of the respective rods is tightened when weight is placed in the pan. When there is no force tending to pull the pan downwardly with respect to the hopper, the two rods are under little stress. However, when weight is placed in the pan, for example the weight of feed in a filled hopper, the two rods tend to bow upwardly. Under these conditions, the two offsets 33 at the centers of the respective rods tend to bite into one another. If it were possible from a practical consideration to provide rods which were absolutely straight and otherwise perfectly formed, the difference in the interlocking relationship of the rods under loaded and unloaded conditions probably would not exist. But as a practical matter, from their very nature, the rods cannot be manufactured and installed with this degree of precision. Thus, the two rods where they meet at the center, may fit together loosely under unloaded conditions. But this loose fit is cured once the pan has a load placed upon it. The two conditions at the center of the rods are shown respectively in Figures 5 and 7. In Figure 5, the loose fit under unloaded conditions is shown; and in Figure 7, the tight interlock provided under loaded conditions is illustrated.

The main advantage to the present cross bar construction is that the two rods lock themselves against displacement as well as locking the hopper against displacement relative to the pan.

The cylindrical poultry feeders provided heretofore in an equivalent size required from twenty to thirty times the amount of storage and shipping space. It is found that the present feeders in knock-down condition can be shipped in a carton approximately twenty inches long, ten inches wide and not over an inch and a half thick. The compact carton may be handled more readily and is less likely to be damaged during shipment than the bulky cartons required for past constructions.

Having described my invention, I claim:

A poultry feeder comprising a hopper having four identical side panels, each side panel tapering from bottom to top, a plurality of tabs extending from one edge of said panel, a flange turned inwardly at right angles from the opposite side edge of said panel, a plurality of slots in the side panel adjacent said flange, said slots complementing said tabs and engaged therewith; a feed pan, said feed pan having a bottom and four side walls, said side walls flaring outwardly from said bottom, an aperture in each of the side walls of the pan and in each of the side panels of the hopper, said apertures being centered with respect to the side edges of the respective walls and panels and lying in a common plane, a pair of rods, said rods being disposed in crossed relationship with each rod traversing the apertures in opposite side walls of the pan and hopper, each rod of the pair having an offset at its center, and the respective offsets engaging one another thereby locking the rods against displacement and locking the hopper against displacement relative to the pan.

GEORGE L. KALB.

References Cited in the file of this patent
UNITED STATES PATENTS

| Number | Name | Date |
|---|---|---|
| 582,410 | Young | May 11, 1897 |
| 907,227 | Eaton | Dec. 22, 1908 |
| 1,005,071 | Randall | Oct. 3, 1911 |
| 1,067,824 | Leichtfuss | July 22, 1913 |
| 1,610,614 | McCollough | Dec. 14, 1926 |
| 2,005,188 | Hedrick | June 18, 1935 |
| 2,426,696 | Kwash | Sept. 2, 1947 |
| 2,464,644 | Kwash | Mar. 15, 1949 |
| 2,475,207 | Smith | July 5, 1949 |